United States Patent
Rubin

(10) Patent No.: US 8,422,417 B2
(45) Date of Patent: Apr. 16, 2013

(54) METHOD OF BROADCASTING AND MULTICASTING USING SATELLITE MEDIUM

(75) Inventor: Darryl Rubin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 764 days.

(21) Appl. No.: 11/857,669

(22) Filed: Sep. 19, 2007

(65) Prior Publication Data
US 2008/0069023 A1  Mar. 20, 2008

Related U.S. Application Data

(63) Continuation of application No. 09/425,776, filed on Oct. 22, 1999, now abandoned.

(51) Int. Cl.
*H04H 20/71* (2008.01)
*H04L 12/56* (2006.01)

(52) U.S. Cl.
USPC ........ 370/312; 370/236; 370/316; 370/395.2; 370/400; 455/12.1; 455/427; 709/227

(58) Field of Classification Search .................. None
See application file for complete search history.

(56) References Cited

U.S. PATENT DOCUMENTS

| | | | |
|---|---|---|---|
| 4,009,345 A * | 2/1977 | Flemming et al. | 370/321 |
| 5,490,139 A | 2/1996 | Baker et al. | |
| 5,570,366 A | 10/1996 | Baker et al. | |
| 5,644,576 A | 7/1997 | Bauchot et al. | |
| 5,659,615 A * | 8/1997 | Dillon | 713/162 |
| 5,812,531 A * | 9/1998 | Cheung et al. | 370/255 |
| 5,852,721 A | 12/1998 | Dillon et al. | |
| 5,991,287 A | 11/1999 | Diepstraten et al. | |
| 6,078,568 A | 6/2000 | Wright et al. | |
| 6,084,864 A * | 7/2000 | Liron | 370/316 |
| 6,157,834 A * | 12/2000 | Helm et al. | 455/436 |
| 6,201,811 B1 | 3/2001 | Larsson et al. | |
| 6,208,625 B1 * | 3/2001 | Zancho et al. | 370/316 |
| 6,243,760 B1 * | 6/2001 | Armbruster et al. | 709/243 |
| 6,289,389 B1 * | 9/2001 | Kikinis | 709/239 |

(Continued)

FOREIGN PATENT DOCUMENTS

CA  2241634  12/1998

OTHER PUBLICATIONS

International Search Report from PCT/US00/2572 filed Sep. 20, 2000.

(Continued)

*Primary Examiner* — John Pezzlo
*Assistant Examiner* — Matthew Campbell
(74) *Attorney, Agent, or Firm* — Microsoft Corporation

(57) ABSTRACT

A method for communicating with multiple network nodes is provided in which each node of a network has a wireless link that allows data to travel to and from the nodes in parallel, thereby taking advantage of the inherent broadcast capabilities of wireless media. The wireless link may be used in parallel with a point-to-point, land-based network linking the nodes. The method may be used for multicasting or broadcasting data on a network. Specifically, the method may be used to maintain a network cache, a routing database and quality of service in a manner that is more efficient and reliable than previous methods that use serial protocols over point to point network links.

20 Claims, 14 Drawing Sheets

U.S. PATENT DOCUMENTS

| | | |
|---|---|---|
| 6,353,599 B1 | 3/2002 | Bi et al. |
| 6,393,261 B1 | 5/2002 | Lewis |
| 6,434,132 B1 | 8/2002 | Ishii et al. |
| 6,563,793 B1 * | 5/2003 | Golden et al. ............ 370/236 |

OTHER PUBLICATIONS

Ivancic, Glover, von Deak and Bhasin, Progress Toward Standards for the Seamless Interoperability of Broadband Satellite Communication Networks, NASA/TM—Jan. 1998.

Chen, Tsai and Gerla, "QoS Routing Performance in Multihop, Multimedia, Wireless Networks", Computer Science Department University of California, Los Angeles, available at haR://citeseer.ni.nec.com/uvdate/13767, accessed Mar. 1, 2001.

Wood, Clerget, Andrikopulos, Pavlou and Dabbous, "IP Routing Issues in Satellite Constellation Networks", International Journal of Satellite Communications, vol. 18 No. 6, Nov./Dec. 2000, John Wiley and Sons 1999, 2000.

Apostolopoulos et al. "QoS Routing Mechanisms and OSPF Extensions", available at htto://wwwdetf orgJ /rfc2676.txt, accessed Mar. 1, 2001, The Internet Society Aug. 1999.

Miller, C. K..: "Reliable Multicast Protocols: A Practical View", Proceedings of 22°d Annual Conference on Local Computer Networks, Nov. 2-5, 1997, pp. 369-378.

Non-Final Office Action cited in U.S. Appl. No. 09/425,776 dated Feb. 11, 2003, 14 pgs.

Reply to Non-Final Office Action cited in U.S. Appl. No. 09/425,776 dated Sep. 22, 2003, 21 pgs.

Final Office Action cited in U.S. Appl. No. 09/425,776 dated Nov. 6, 2003, 15 pgs.

Amendment after Final Office Action cited in U.S. Appl. No. 09/425,776 dated Mar. 21, 2004, 31 pgs.

Advisory Action cited in U.S. Appl. No. 09/425,776 dated Apr. 5, 2004, 3 pgs.

Reply to Final Office Action cited in U.S. Appl. No. 09/425,776 dated May 10, 2004, 30 pgs.

Non-Final Office Action cited in U.S. Appl. No. 09/425,776 dated Jul. 29, 2004, 12 pgs.

Reply to Non-Final Office Action cited in U.S. Appl. No. 09/425,776 dated Dec. 3, 2004, 6 pgs.

Final Office Action cited in U.S. Appl. No. 09/425,776 dated Apr. 19, 2005, 15 pgs.

Amendment after Final Office Action cited in U.S. Appl. No. 09/425,776 dated Jun. 22, 2005, 35 pgs.

Advisory Action cited in U.S. Appl. No. 09/425,776 dated Jul. 12, 2005, 3 pgs.

Non-Final Office Action cited in U.S. Appl. No. 09/425,776 dated Aug. 22, 2006, 21 pgs.

Reply to Non-Final Office Action cited in U.S. Appl. No. 09/425,776 dated Nov. 27, 2006, 25 pgs.

Final Office Action cited in U.S. Appl. No. 09/425,776 dated Mar. 19, 2007, 21 pgs.

Amendment After Final Office Action cited in U.S. Appl. No. 09/425,776 dated May 21, 2007, 43 pgs.

Advisory Action cited in U.S. Appl. No. 09/425,776 dated Jun. 6, 2007, 3 pgs.

* cited by examiner

METHOD OF BROADCASTING AND MULTICASTING USING SATELLITE MEDIUM

CROSS REFERENCE TO RELATED APPLICATIONS

This application is a continuation of U.S. application Ser. No. 09/425,776, filed Oct. 22, 1999 now abandoned entitled METHOD FOR COMMUNICATING WITH MULTIPLE NETWORK NODES, which application is incorporated herein by reference in its entirety.

TECHNICAL FIELD

This invention relates generally to computer network communication and, more particularly, relates to a method for communicating with multiple network nodes.

BACKGROUND OF THE INVENTION

In today's computer networks, there is an increasing demand for multicasting capabilities. Multicasting is the act of sending a single data message from one node in the network to a group of other nodes. When the group includes all of the nodes in the network, the act is generally referred to as "broadcasting." Currently, large networks such as the Internet implement multicasting by sending a message serially from one node to another, making multiple copies of the multicast data at strategic points along the way, and sending the copies down the various network paths and, eventually, to the members of the multicast group. One problem with this method is that it is inefficient, since it requires the various network nodes to expend processing power to make and transmit additional copies of the message. Another more fundamental problem is that multicasting is intended to be a parallel process—i.e. each of the recipient nodes should receive the data simultaneously—but land-based network links are inherently serial, requiring a message to be relayed from node to node before reaching its final destination. This can result in propagation delays, causing distant nodes to receive the message much later than nodes closer to the origin. Sophisticated multicast protocols have been developed to address these problems, but they consume processing overhead and only represent stopgap measures.

One specialized form of multicasting occurs in packet switched networks such as the Internet and involves the use of routers, which are a type of network node that directs data traffic between different devices on the network. When two or more computer in the network send data to one another during a communication session, routers "route" the data by determining the most appropriate paths over which the data should flow based on a number of criteria, including distance and Quality of Service (QOS). In order to make this determination, the routers have to create and maintain a routing database that describes the routing topology of the network. The routing database requires constant updating, since the routing topology can change quickly as a result of the addition, deletion, and failure of network equipment. Moment to moment changes in traffic loads at different parts of the network also need to be reflected in the routing database, since these changes can instantaneously cause previously optimal routes to become sub-optimal.

In the current approach to routing, the routers use the conventional network paths themselves to update each other with local routing data. One problem with this approach is that the very act of sending the updates impacts the data traffic on the network, and can render the updates inaccurate. Another problem relates back to the serial nature of conventional network links, in that updates transmitted by one router will reach nearby routers relatively quickly, while updates to distant routers will take much longer. As a result, a router will tend to have a good picture of the network in the local area, but a relatively out-of-date picture of distant parts of the network.

Routing protocols have been developed to ameliorate these problems, but like multicast protocols, they consume processing power and can only solve the problem to a limited degree. For example, if the network conditions change faster than the shortest time it takes a message to travel across the network, routers will always be out of date with respect to current network conditions, and thus make suboptimal routing decisions. Thus, existing QOS protocols need to deal with cases where not all of the desired resources are still available by the time the protocol requests reach the node(s) holding those resources. In a network with rapidly changing conditions, it is difficult for the protocol to successfully "seize the moment" to allocate a set of resources that are dispersed across the network. Existing QOS protocols must use various allocation and error recovery techniques that are complicated and suboptimal.

Thus it can be seen that there is a need for a method of communicating to a plurality of network nodes in parallel that can be applied to real-world problems such as network routing.

SUMMARY OF THE INVENTION

In accordance with this need, a method for communicating with multiple network nodes is provided in which each node of a network has a wireless link that allows data to travel to and from the nodes in parallel, thereby taking advantage of the inherent broadcast capabilities of wireless media. The method may be used for multicasting or broadcasting in general as well as for specialized functions such as maintaining a network cache and maintaining network routing information. Each node may be a router or similar device that uses its wireless link to transmit local routing data messages to a central server. The central server then processes the local routing data to update a routing database. Because all node transmission reach the central server essentially at the speed of light, the routing database will represent a nearly instantaneous and accurate picture of the network routing topology. The central server then broadcasts the routing database (or updates to the routing database) to all of the nodes in the network using the wireless medium. The nodes will use the routing database to efficiently route network data in order to ensure efficient routing and to maintain the appropriate Quality of Service (QOS).

Alternatively, each node may broadcast a local routing data message to the other nodes in the network via wireless medium. Each node then processes the local routing data messages received from the other nodes to maintain its own copy of the routing database. This eliminates the need for a central server, although a central server may be used concurrently.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
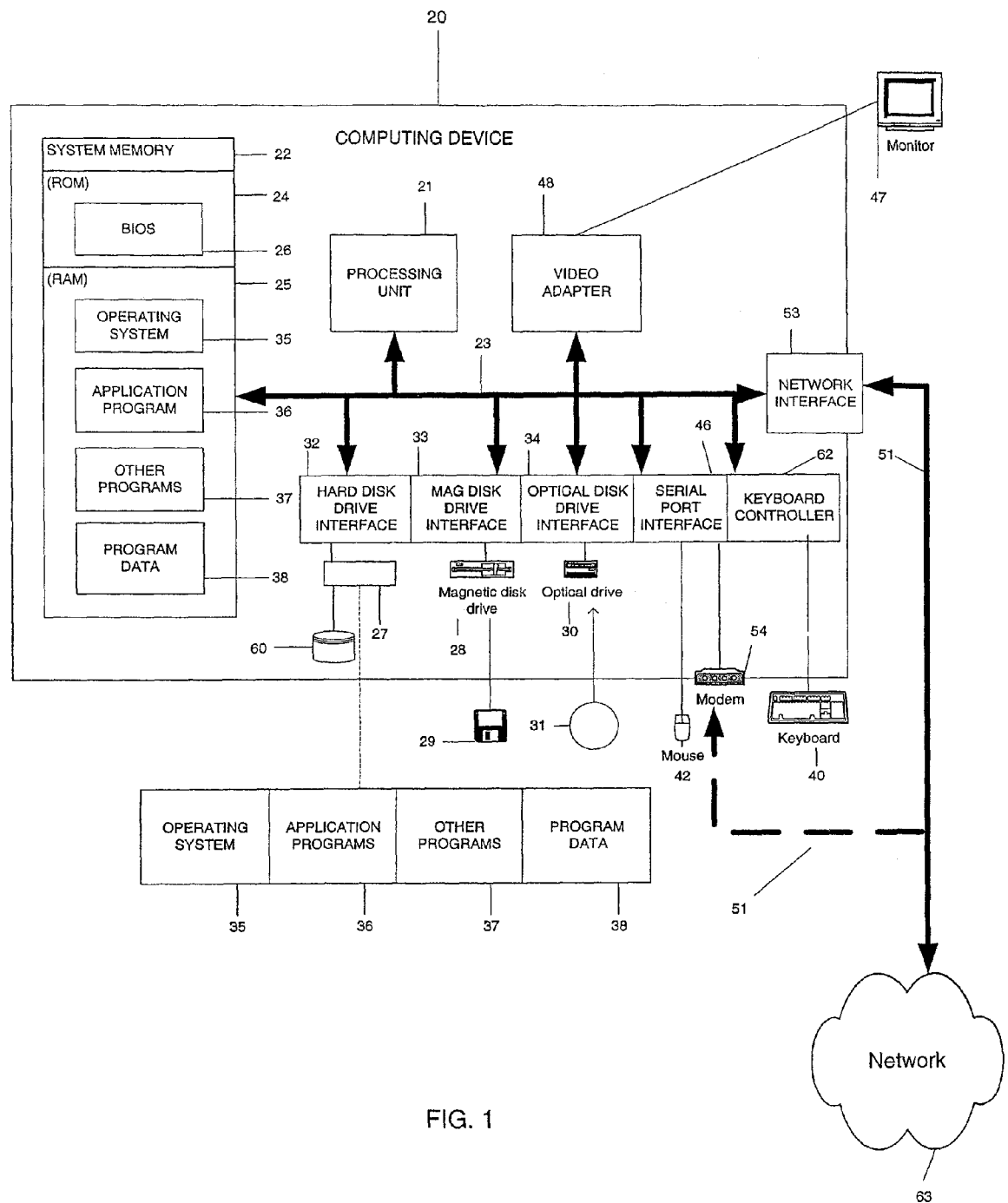
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as programs, being executed by a computing device. Generally, programs include routines, other programs, objects, components, data structures, dynamic-linked libraries (DLLs), executable code, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, parts of a program may be located in both local and remote memory storage devices.

With reference to FIG. 1, an exemplary system for implementing the invention is shown. The system includes a general purpose-computing device 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computing device 20, such as during start-up, is stored in the ROM 24. The computing device 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, programs and other data for the computing device 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of programs may be stored on the hard disk 60, magnetic disk 29, optical disk 31, ROM 24 or RAM 25, including an operating system 35, one or more application programs 36, other programs 37, and program data 38. A user may enter commands and information into the computing device 20 through input devices such as a keyboard 40, which is typically connected to the computing device 20 via a keyboard controller 62, and a pointing device, such as a mouse 42. Other input devices (not shown) may include a microphone, joystick, game pad, wireless antenna, scanner, or the like. These and other input devices are often connected to the processing unit 21 through a serial port interface 46 that is coupled to the system bus, but may be connected by other interfaces, such as a parallel port, game port, a universal serial bus (USB), or a 1394 bus. A monitor 47 or other type of display device is also connected to the system bus 23 via an interface, such as a video adapter 48. In addition to the monitor, computing devices typically include other peripheral output devices, not shown, such as speakers and printers.

The computing device 20 may operate in a networked environment using logical connections to one or more devices within a network 63, including another computing device, a server, a network PC, a peer device or other network node. These devices typically include many or all of the elements described above relative to the computing device 20. The logical connections depicted in FIG. 1 include a land-based network link 51, for which there are many possible implementations, including a local area network (LAN) link and a wide area network (WAN) link. Land-based network links are commonplace in offices, enterprise-wide computer networks, intranets and the Internet and include such physical implementations as coaxial cable, twisted copper pairs, fiber optics, and the like. Data may transmitted over the network links 51 according to a variety of well-known transport standards, including Ethernet, SONET, DSL, T-1, and the like. When used in a LAN, the computing device 20 is connected to the network 51 through a network interface card or adapter 53. When used in a WAN, the computing device 20 typically includes a modem 54 or other means for establishing communications over the network link 51, as shown by the dashed line. The modem 54, which may be internal or external, is connected to the system bus 23 via the serial port interface 46. In a networked environment, programs depicted relative to the computing device 20, or portions thereof, may be stored on other devices within the network 63.

In the description that follows, the invention will be described with reference to acts and symbolic representations of operations that are performed by one or more computing devices, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data.

However, while the invention is being described in the foregoing context, it is not meant to be limiting as those of skill in the art will appreciate that various of the acts and operation described hereinafter may also be implemented in hardware.

Figure 2:
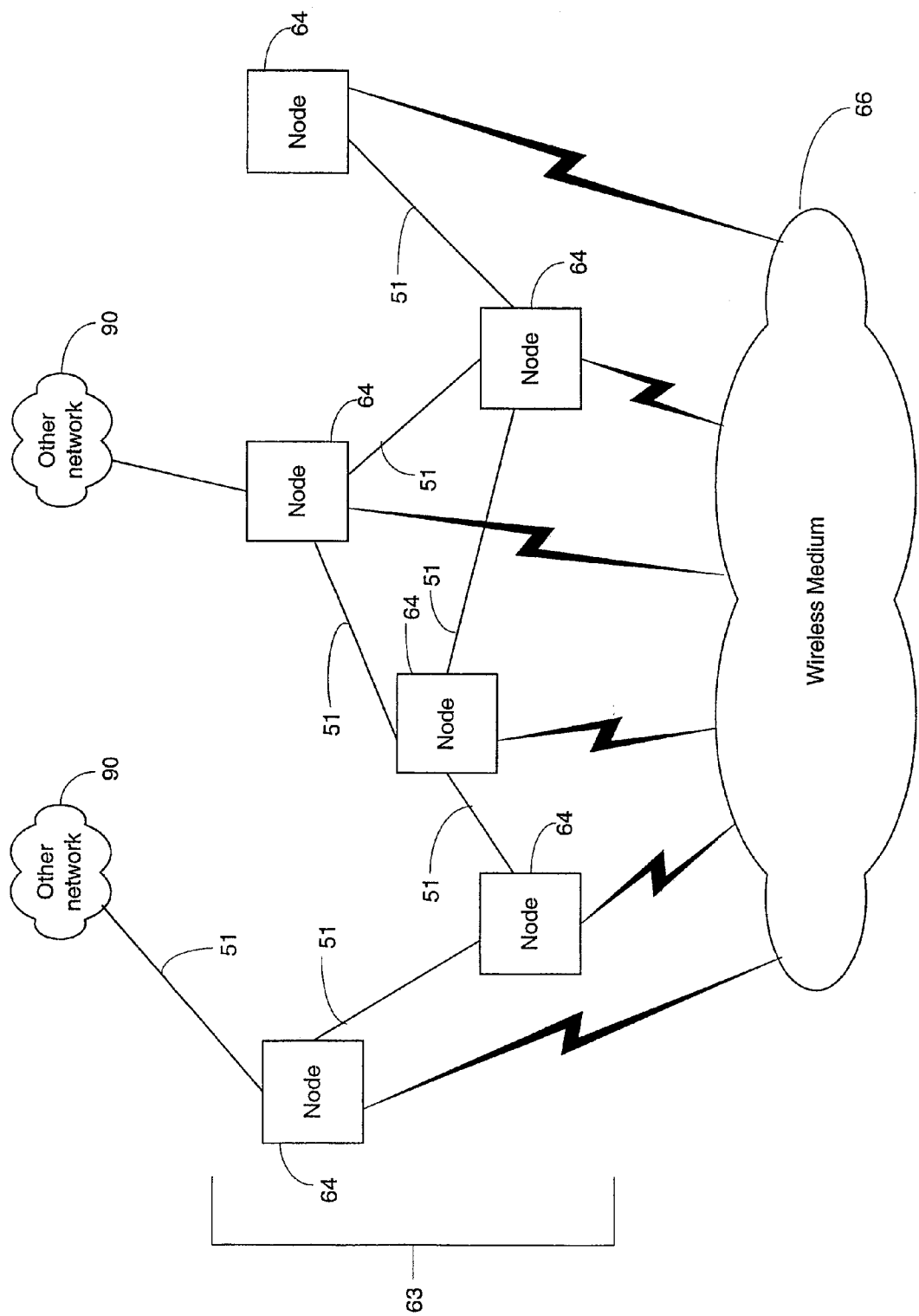
FIG. 2 is a block diagram showing an exemplary computer network.
Figure 3:
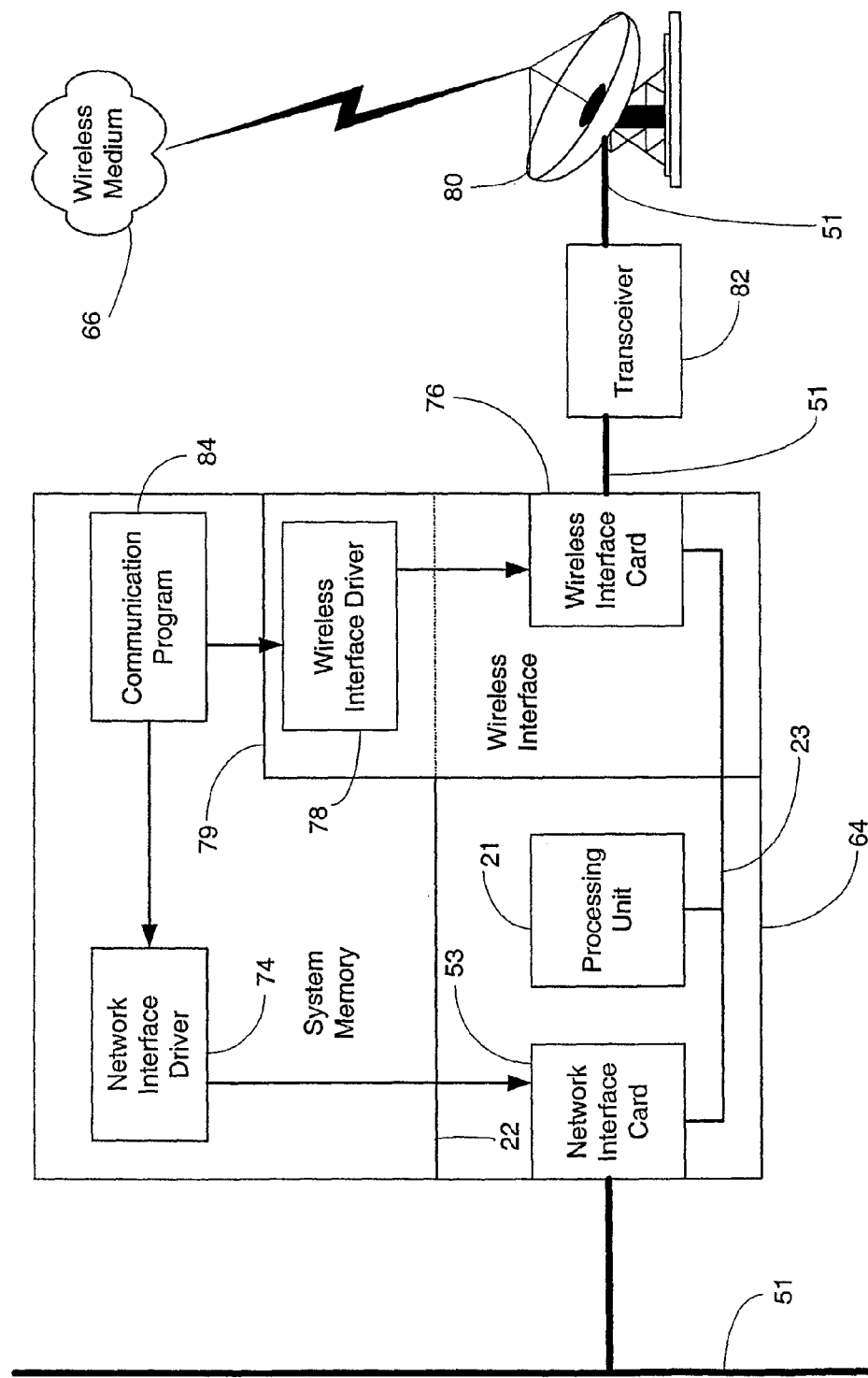
FIG. 3 is a block diagram of an implementation of a node.

Referring to FIGS. 2 and 3, a preferred embodiment of the invention is shown as being implemented on an exemplary computer network 63. As best shown in FIG. 2, the exemplary computer network 63 includes a plurality of nodes 64 and may be linked to one or more other networks 90. Each of the nodes 64 is a personal computer, server, workstation, or other computing device, and includes many or all of the components shown in FIG. 1 with respect to the computing device 20. The nodes 64 are linked for network communication with one another through a series of conventional network links 51. As best shown in FIG. 3, each node 64 has a processing unit 21, a system memory 22, a network interface card 53 linked to one another by a system bus 23, and may also have several components in addition to those described in FIG. 1, including a network interface driver 74, and a wireless interface 79 comprising a wireless interface driver 78 and a wireless interface card 76. The node 64 is communicatively linked to at least one of the network links 51. The wireless interface 79 is communicatively linked to an antenna 80 and a transceiver 82 over a network link 51. A communications program 84 is executable by the processing unit 21 to cooperate with the wireless driver 78 in order to send and receive data over the wireless medium 66 via the wireless interface 79. Specifically, the wireless interface driver 78 converts messages from the communication program 84 into a transmissible format required by the wireless interface card 76. The wireless interface card 76, in turn, converts the message into a physical transport format in order to transmit the messages through the wireless medium 66. The transceiver 82 receives the physical message from the wireless interface card 76, creates the actual signals required for transmission over the wireless medium 66 and sends those signals to the antenna 80 for transmission. The wireless interface driver 78 also converts signals received through the wireless medium into messages that the communication program 84 can relay to the appropriate part of the node 64.

Referring again to FIG. 2, each node 64 is capable of communicating with a wireless medium 66 in order to send and receive messages in parallel to and from a plurality of other nodes. The wireless medium 66 may include one or more wireless networks, low-earth orbiting satellites, geosynchronous orbiting satellites, cellular transmission sites, microwave relays, and the like, which communicate over one or more portions of the light spectrum. It is contemplated that the network 63 may cover a geographic area of any size. For example, the network 63 may encompass an entire county and require only one transmission tower in the wireless medium 66, or it may be worldwide, and require multiple satellites. It is also contemplated that the networks 90 may also implement the invention, thereby allowing them to achieve parallel communication internally, while communicating with the network 63 in a conventional manner.

Figure 4A:
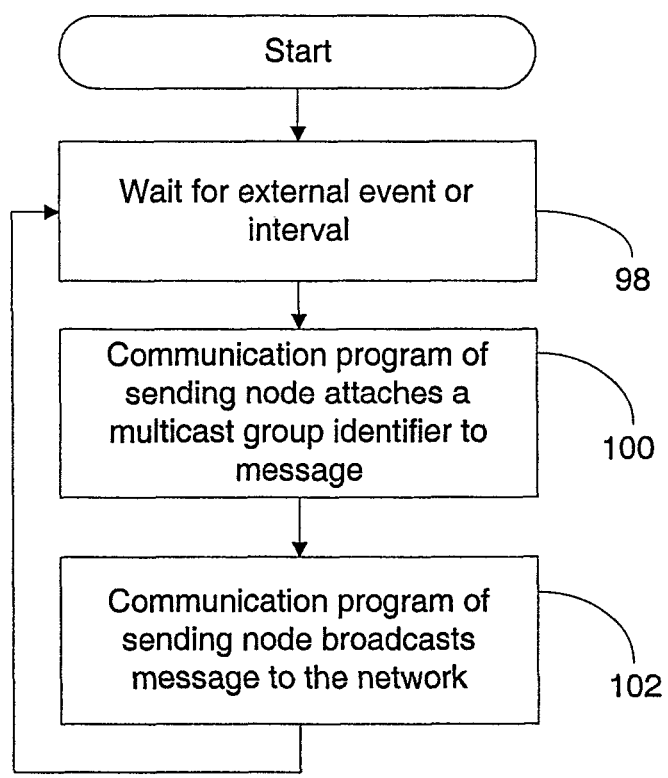
FIG. 4a is a flowchart generally depicting the flow of control of a communications program when sending a multicast message.

To send a message from one of the nodes 64 to a group of other nodes, and to process the message once received, the communication program 84 (FIG. 3) may execute the procedure of FIG. 4a. At step 98, the communication program 84 remains in a wait state until a predetermined event, such as a multicast message becoming available to send, or until a predetermined interval of time passes. At step 100, the communications program 84 attaches a multicast group identifier to the message. The multicast group identifier represents the group of nodes to which the message is intended, and may also represent the entire set of nodes on the network 63. The communications program 84 then broadcasts the message to the nodes 64 of the network 63 via the wireless medium 66 at step 102. It then returns to a wait state at step 98.

Figure 4B:
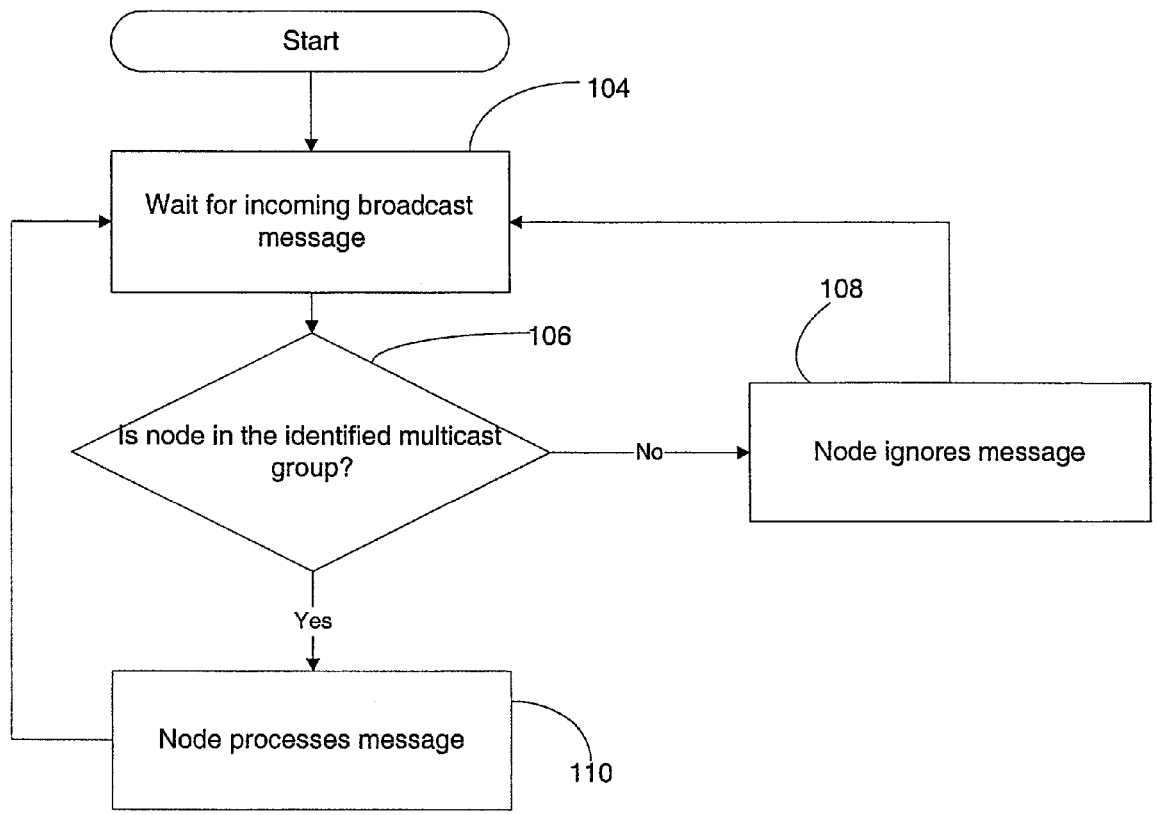
FIG. 4b is a flowchart generally depicting the flow of control of a communications program when receiving a multicast message.

To handle an incoming multicast message, the communication program 84 may execute the steps of the flowchart of FIG. 4b. At step 104, the communication program 84 remains in a wait state until it receives a multicast message. When the multicast message arrives, the communication program 84 proceeds to step 106, during which the communication program 84 reads the group identifier of the message to determine whether the receiving node is a member of the multicast group. If the receiving node is not a member, the communication program 84 running on that node ignores the message at step 108. If the receiving node is a member, then the communication program 84 processes the message at step 110. Steps 104-108 may also be performed by the wireless card 76 using hardware or software logic on the card The communication program 84 on the sending node may also send the broadcast or multicast message over a wireless channel that is dedicated to a particular multicast group of nodes. Similarly, the communication program 84 running on a receiving node in that group may monitor the dedicated multicast channel and treat any message received over that channel as a message that needs to be processed. If a dedicated channel is used in this manner, it would not be necessary for the communication program 84 of the sending node to add a multicast group identifier to the message. Having a dedicated multicast channel may be especially useful when the multicast group is relatively stable and well-defined, or when only a small number of multicast groups is required.

Figure 5:
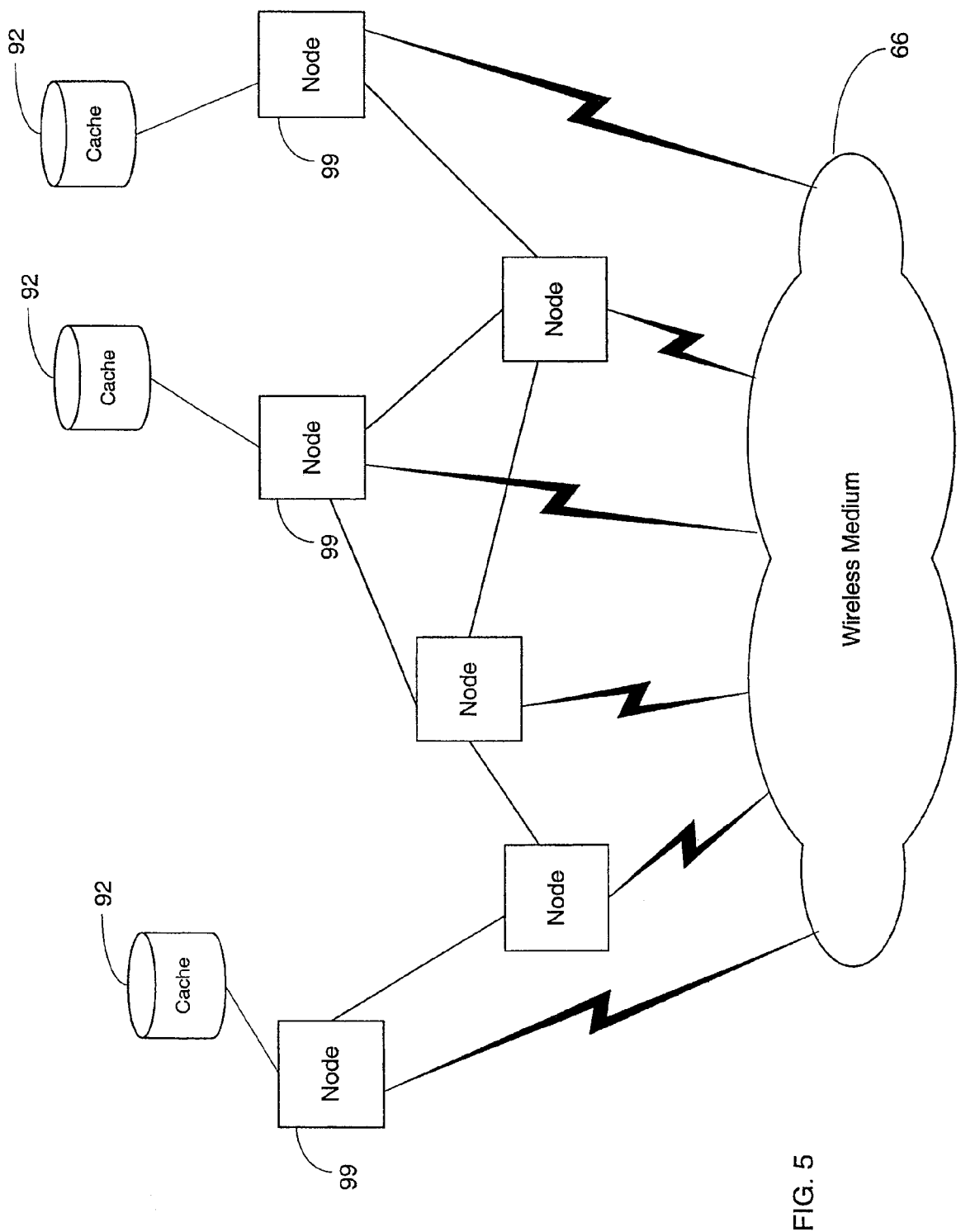
FIG. 5 is a block diagram illustrating a network cache.

Referring to FIG. 5, an example of how the invention may be used to maintain a network cache is shown. The illustrated network 63 has a plurality of nodes, but only the nodes 99, hereinafter referred to as "cache nodes," are used to maintain copies 92 of the network cache. To maintain the coherency of the network cache, each of the cache nodes 99 sends conventional cache updates to the other nodes by multicasting the updates over the wireless medium 66 as described above and shown in FIG. 4a. Since this multicast group is well-defined, it may be preferable to have a dedicated wireless channel over which the updates can be sent and received. Each copy 92 of the network cache is typically maintained on a separate computer (not shown) coupled to, but not necessarily co-located with the node 99. The network cache may contain web pages, audio and video files and other information to make it available when needed for speed and consistency. Although the logic for actually updating a network cache is well-known, the invention allows the copies 92 of the cache to be updated throughout the network in parallel using a single transmission This results in a very large savings of network bandwidth and processing overhead when, for example, updating large web sites and/or video sites that may consist of hundreds of megabytes of data. It is contemplated that the cache node 99 may be a router or similar device, and that the functions of sending and receiving routing updates as well as sending and receiving broadcast cache updates may be performed by the communication program 84 and wireless interface 79 on the cache node 99. It is also contemplated that the cache updates may be performed by using the land-based links 51 in the event the wireless link fails.

Figure 6:
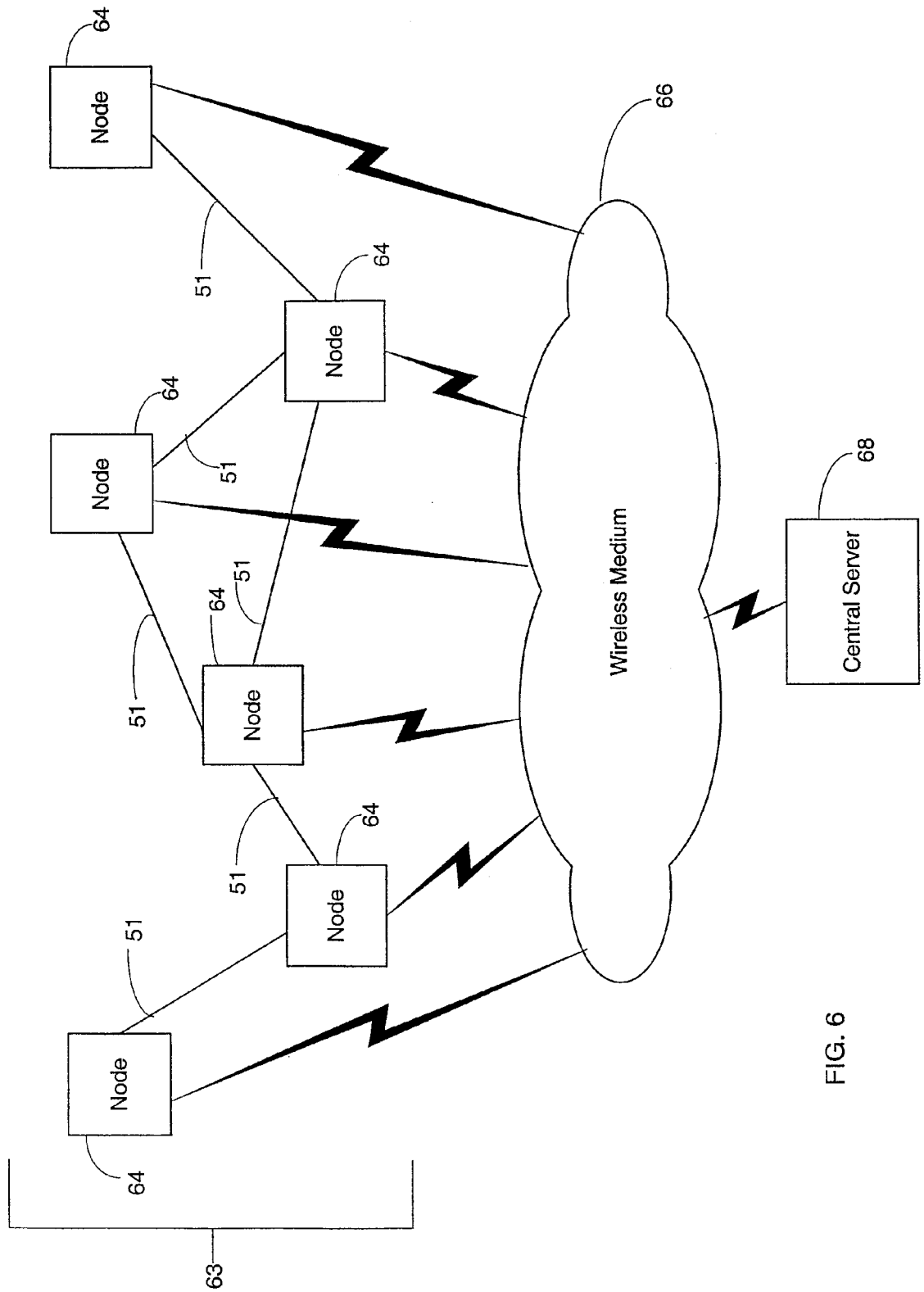
FIG. 6 is a block diagram illustrating an implementation of a computer network in wireless communication with a central server.
Figure 7:
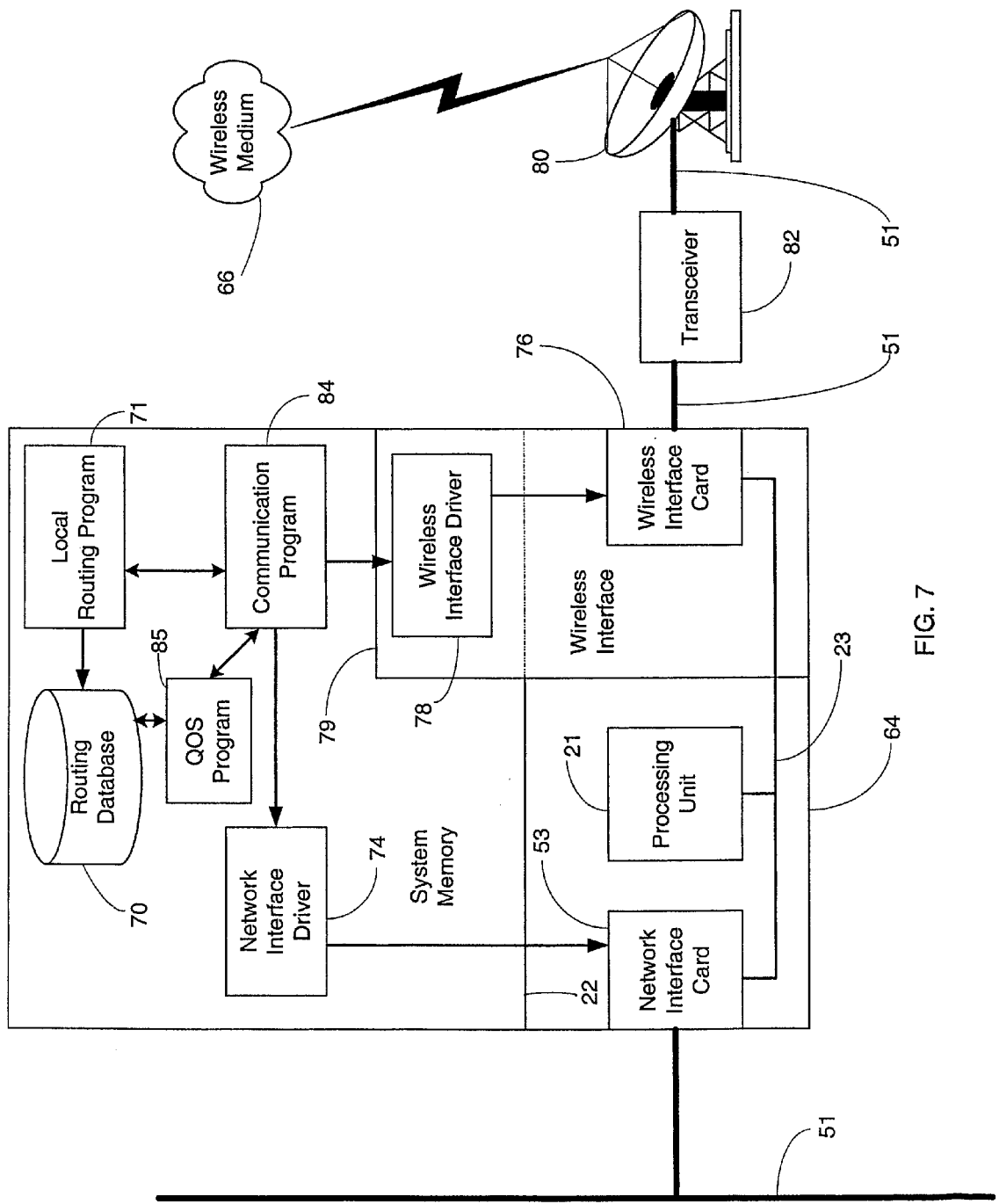
FIG. 7 is a block diagram illustrating an implementation of a network node from FIG. 6.
Figure 8:
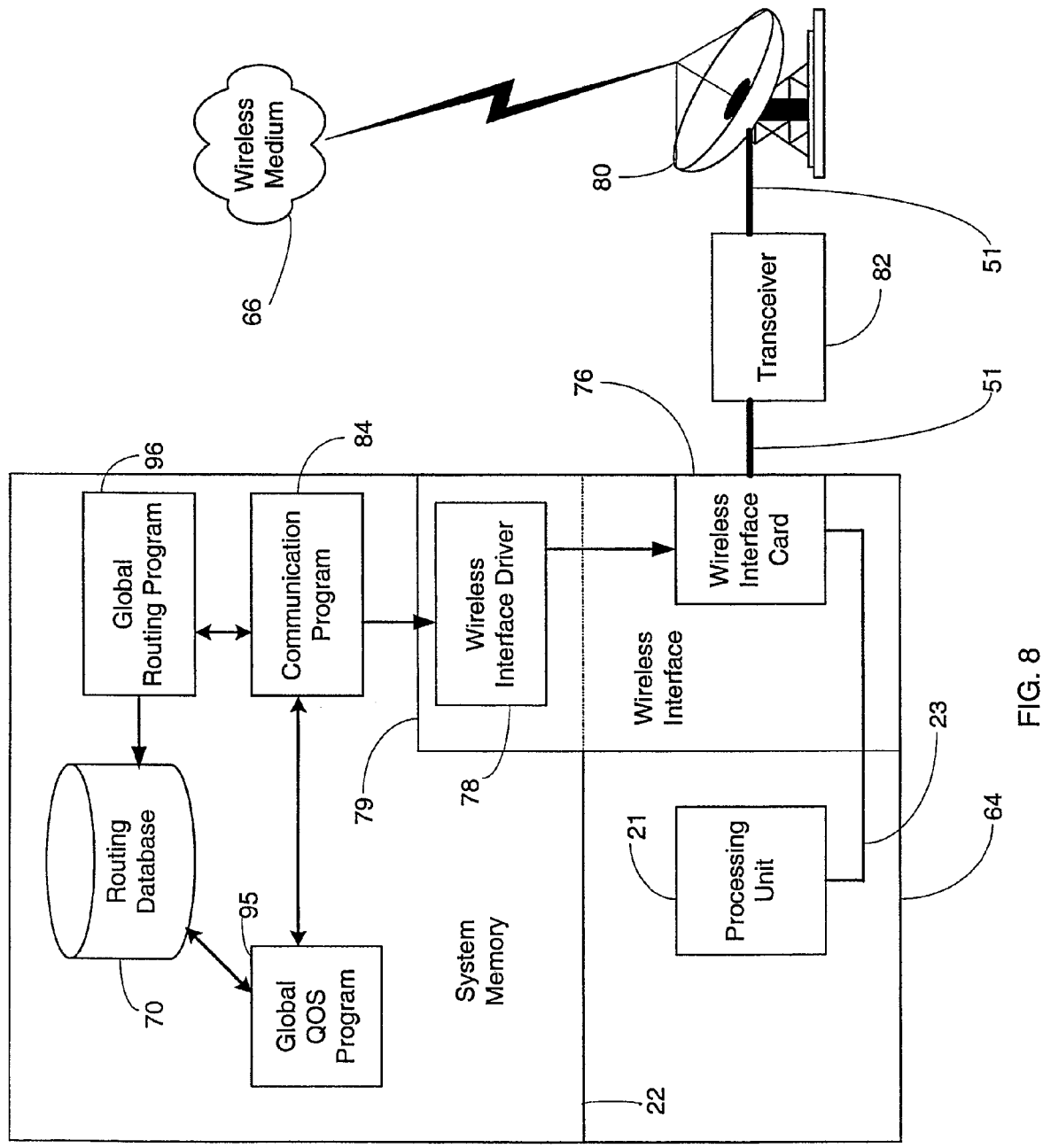
FIG. 8 is a block diagram illustrating an implementation of the central server from FIG. 6.

Referring to FIGS. 6-8, an embodiment of the described method is used to maintain routing information and QOS in a network 63. As best shown in FIGS. 6 and 7, each node 64 of the illustrated network is implemented as a router, gateway, or similar device and communicates via the wireless medium in the same manner as the exemplary node 64 of FIG. 3. The node 64 also includes a local routing program 71 to conventionally collect local routing data and transmit the local routing data via the communication program 84 and over the wireless medium 66 to a central server 68. The node 64 may also include a QOS program 85 for requesting resources, such as a network route having the needed performance characteristics for a communication session, from the central server 68 in order to maintain the appropriate QOS.

As shown in FIG. 6, the maintenance of the routing information is centralized at the central server 68, and thus it is feasible to implement the central server 68 as a powerful computing device that is optimized to process large quantities of routing data and to make decisions regarding the assignment of network buffers, links, routes, and the like to specific communication sessions based on their QOS needs Also, each of the nodes 64 in this embodiment would not need to have the ability to make routing decisions although it may be desirable that they retain this ability in case they lose contact with the central server 68.

As best shown in FIG. 8, the central server 68 includes many or all of the components of the computing device 20 shown in FIG. 1. Like the nodes 64, the central server 68 includes a wireless interface 79 comprising a wireless interface driver 78 and wireless interface card 76. The wireless interface 79 is communicatively linked to a wireless antenna 80 via a transceiver 82. A global routing program 96 sends and receives routing data via the communication program 84 as previously described. While not shown in FIG. 6, the central server 68 may also be linked to the nodes 64 via land connection in case the wireless communication fails.

The central server 68 executes a global routing program 94 and a global QOS program 95. The global routing program 94 uses the local routing data received from the nodes 64 to update a routing database 70. The routing database 70 represents the current routing topology of the network, including the availability of the routes and the traffic along the routes. The global QOS program 95 receives requests for resources from the nodes 64 and, when the resources are available, allocates those resources by communicating with the appropriate nodes 64 in parallel via the wireless link. For example, a node 64 needing to transfer a large file may request that a high-bandwidth data path through the network 63 be reserved. The QOS program may then respond by choosing the best available route through the network for the transfer and attempting to allocate the CPU time and buffers needed in the various routers along the route using a standard QOS protocol.

Figure 9:
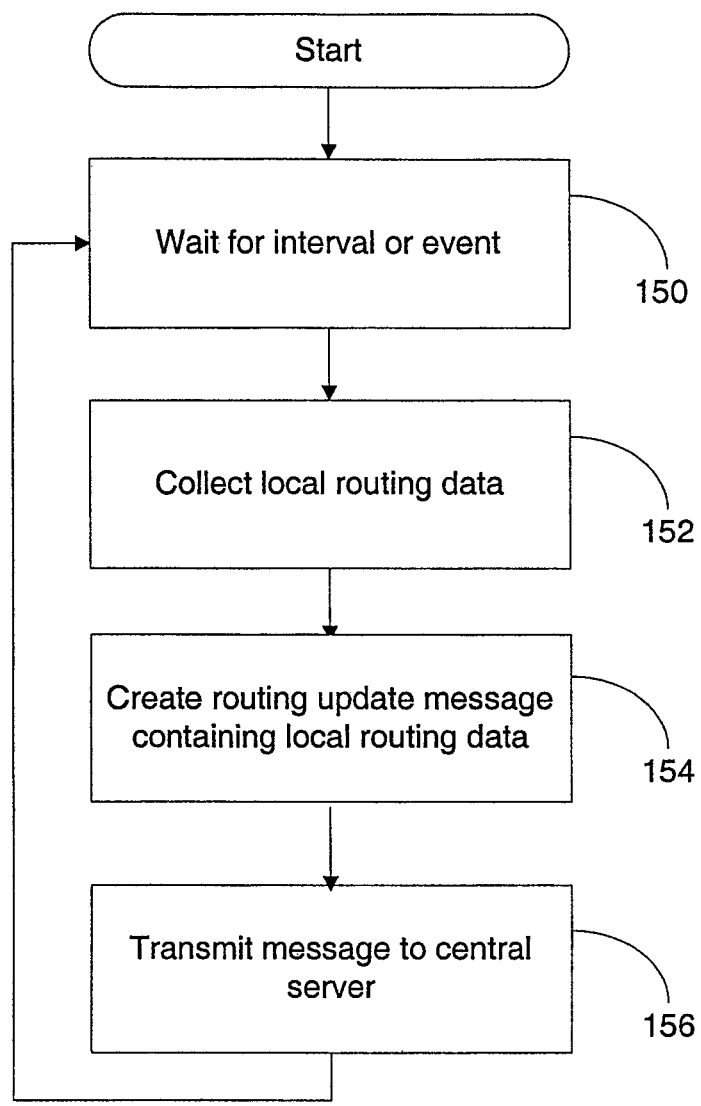
FIG. 9 is a flowchart generally depicting the flow of control of one of the local routing program of FIG. 7 when providing an update to a central server.

In order to provide the local routing data to the central server 68 so that the routing database 70 can be maintained, the local routing program 71 (FIG. 7) executes on the node 64 according to the flowchart of FIG. 9. At step 150, the local routing program 71 waits for an interval of time to elapse before proceeding to the next step. This interval may correspond to predefined update interval. Alternatively, the local routing program 71 may wait for an event, such as a significant change in the data traffic at the node 64, before proceeding. At step 152, the local routing program 71 conventionally collects the local routing data, which may include the status of communication between that node and any adjacent nodes, the volume of the data traffic at the node and the latency and error rate being experienced on each link attached to the node. At step 154, the local routing program 71 creates a message containing the local routing data, and attaches an origin identifier to identify the node from which the message is being sent. At step 156, the local routing program 71 transmits the message to the central server 68 via the wireless medium 66, using a broadcast or multicast.

Figure 10:
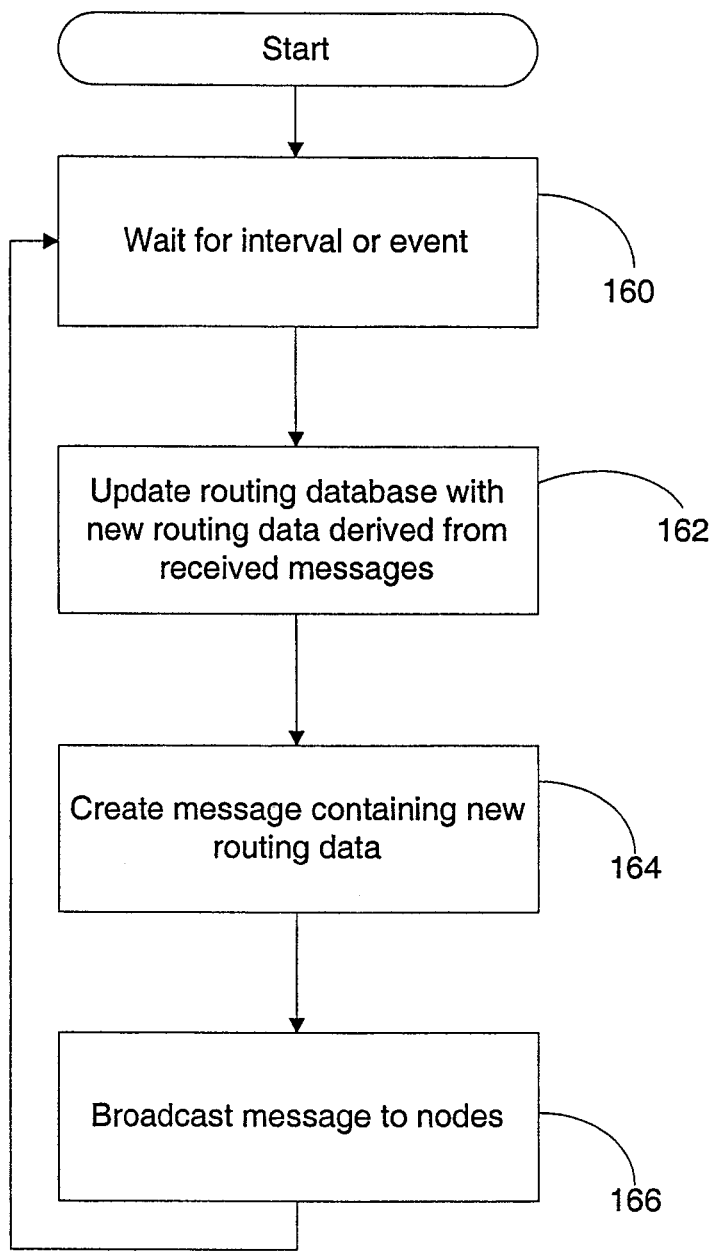
FIG. 10 is a flowchart generally depicting the flow of control of a global routing program for maintaining the routing information in the network.

To maintain the routing information in the network and to provide the latest version of the routing database 70 to the nodes 64, the global routing program 96 executes on the central server 68 according to the flowchart of FIG. 10. It is assumed that the central server 68 starts the procedure with an initial version of the routing database 70. This initial version may be determined dynamically by the server and represent the current state of the network upon entry into the procedure of FIG. 10 or it may be one that is automatically loaded by the central server 68 at initialization.

At step 160, the global routing program 96 waits for the receipt of local routing data from the nodes 64. It is contemplated that the global routing program 96 may wait for a predetermined number of updates to be received before continuing to the next step. For example, the global routing program 96 may wait until at least 50% of the nodes have reported their local routing data. Alternatively, the global routing program 96 may wait for a predetermined interval and then proceed with the remaining steps, regardless of how many updates have been received from the nodes 64. At step 162, the global routing program 96 updates the routing database 70 with the local routing data received from the nodes 64. At step 164, the global routing program 96 creates a routing update message representing the update made to the routing database at step 162. Alternatively, the routing update message may include the updated routing database itself. At step 166, the global routing program broadcasts the routing update message to the nodes 64. The program then returns to a wait state at step 160.

Figure 11:
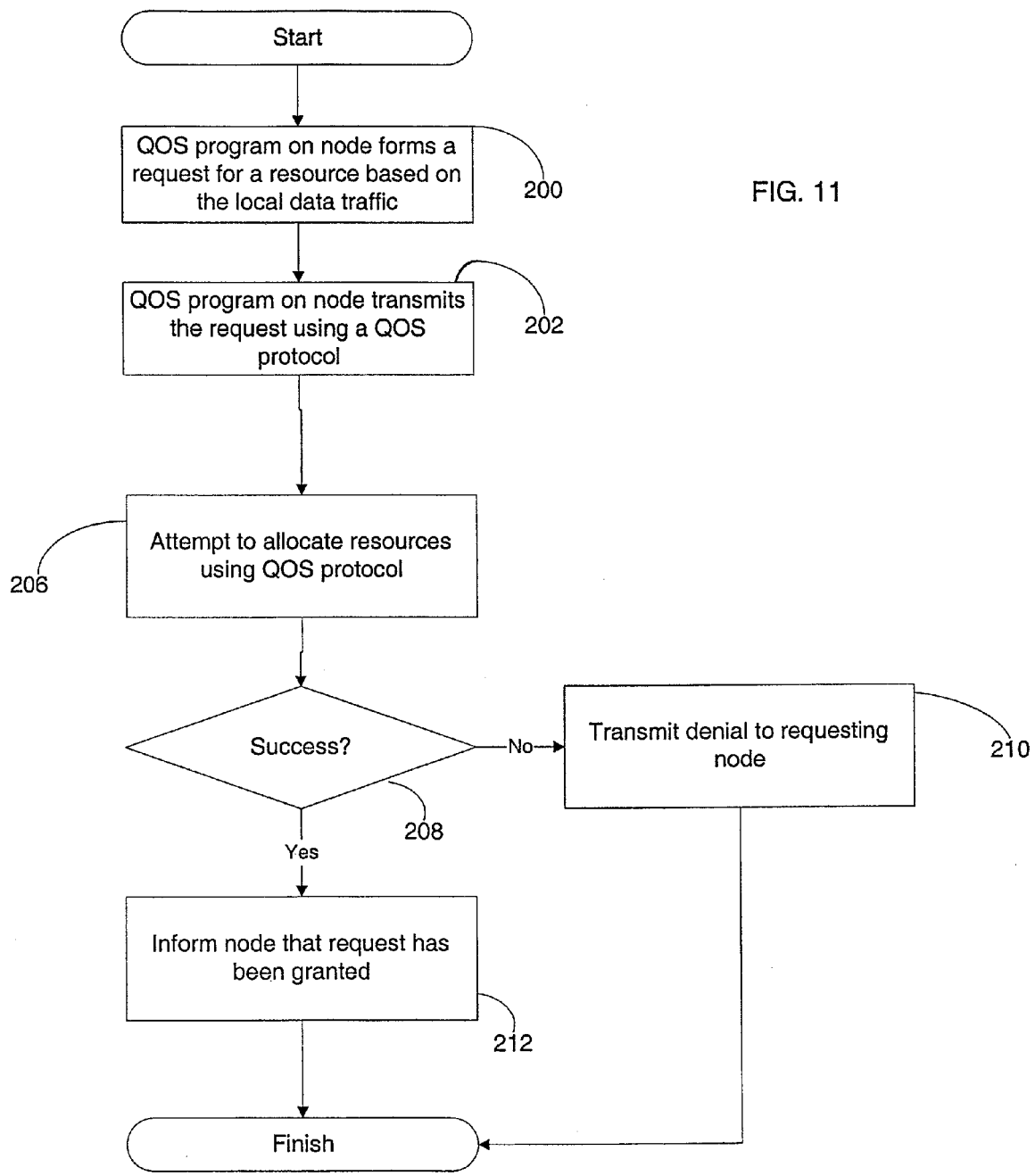
FIG. 11 is a flowchart generally depicting the flow of control of a for the nodes and the central server in order to maintain quality of service.

To allocate network resources in order to maintain the proper QOS on the network 63, the central server 68 and one or more of the nodes 64 can perform the procedure of FIG. 11. At step 200, the QOS program 85 on a node 64 forms a request for a resource based on a request received from a personal computer, server, or other client of the network. At step 202, the QOS program 85 transmits the request for a network resource to the central server 68 via the communication program 84 and the wireless medium 66 using a standard QOS protocol. The central server 68 receives the request and executes the global QOS program 95 to process the request. The global QOS program 95 may then wait for a certain interval in order to give other nodes the opportunity to submit requests. At step 206, the global QOS program 95 attempts to allocate the requested resources over the wireless medium 66 using a QOS protocol. Such an attempt may involve repeatedly contacting the various nodes from which the resources will be required, looking for alternative resources, waiting for acknowledgments from the nodes, and the like. If the attempt is successful, then the global QOS program 95 sends a message to the requesting node indicating that the request has been granted at step 212. If the attempt is unsuccessful, then the global QOS program 95 transmits a denial to the requesting node at step 210.

Figure 12:
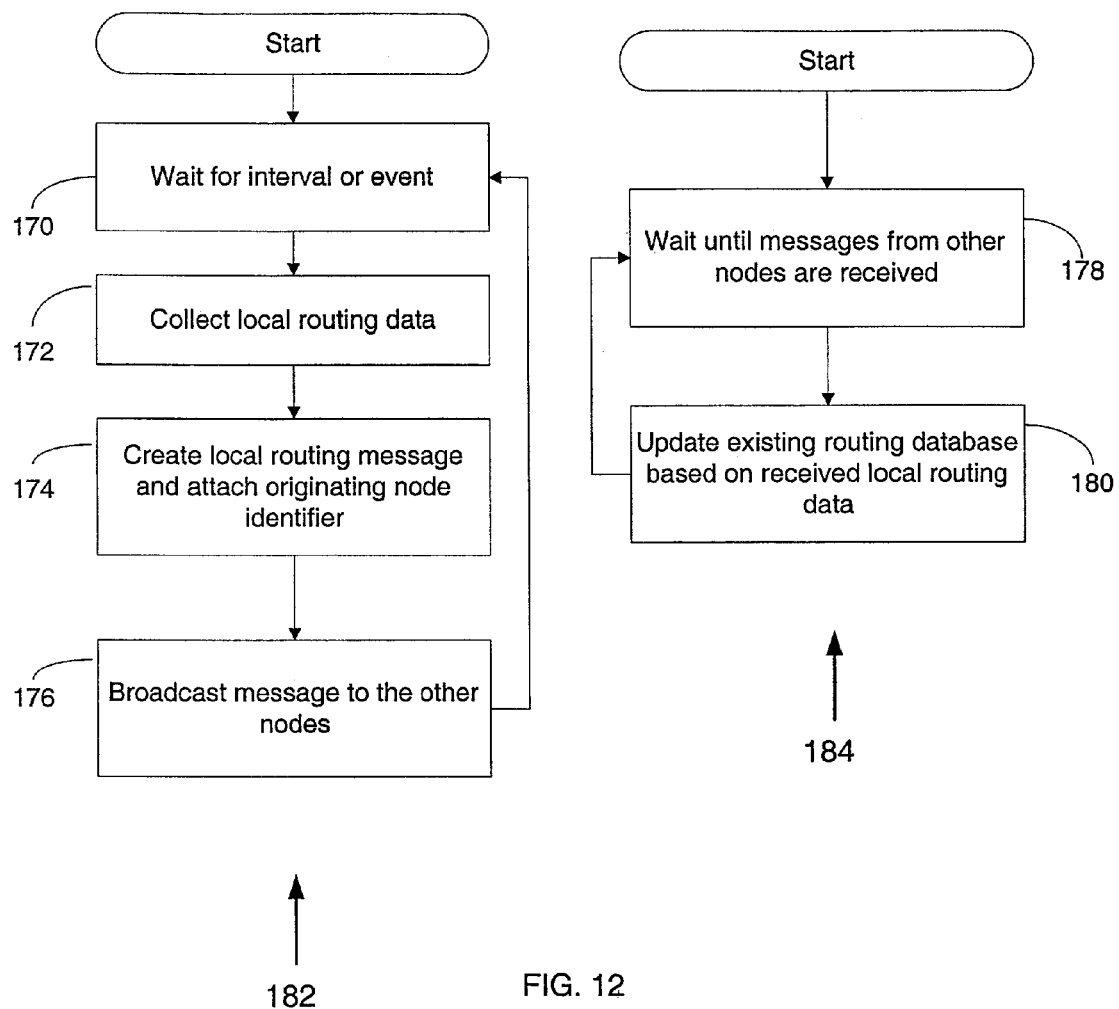
FIG. 12 is a pair of event loops generally depicting the flow of control of the local routing program of FIG. 7 when maintaining a routing database in a network without a central server.

In another embodiment, the nodes 64 of the network depicted in FIG. 6 may transmit and receive local routing data to and from one another without the use of the central reservation server 68. To maintain the routing database 70 according to this embodiment, the local routing program 71 may execute event loops 182 and 184 asynchronously on a node 64 as shown in FIG. 12. At step 170 of event loop 182, the local routing program 71 may be in a wait state until a predetermined event occurs, similar to the wait state described in step 160 of FIG. 10. At step 172, the local routing program 71 collects the local routing data in a well known manner. At step 174, the local routing program 71 creates a local routing message containing the local routing data, and attaches an origin identifier representing the node from which the-message is being sent. If there are other, non-router nodes in the network, the local routing message may also have a multicast group identifier that corresponds to the group of router nodes. The receiving nodes may use the multicast group identifier to determine whether to process or ignore the local routing message. Alternatively, the local routing program 71 may select a channel that is dedicated to the router nodes. At step 176, the local routing program 71 broadcasts the message to each of the other nodes 64 of the network via the wireless medium 66. The process then returns to step 170.

In event loop 184, the local routing program waits until it receives local routing messages containing local routing data and having origin identifiers from the other nodes 64 via the wireless medium 66 at step 178. The local routing program 71 then updates the routing database 70 using the local routing data received from the other nodes 64 at step 180. The process then returns to step 178.

Figure 13:
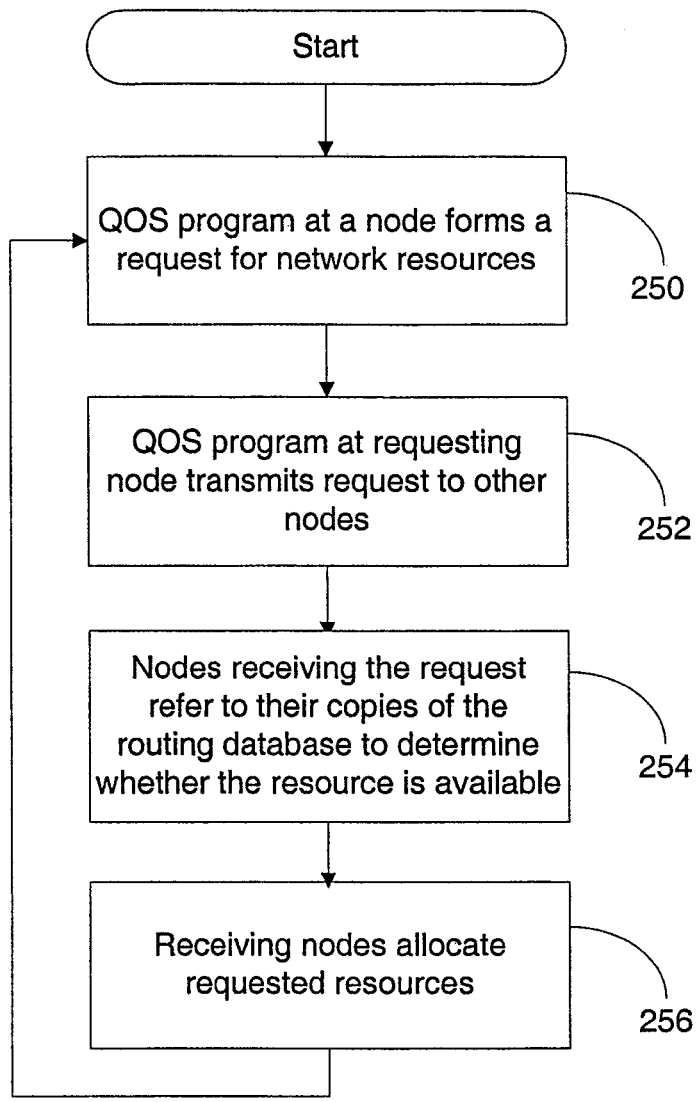
FIG. 13 is a flowchart generally depicting the flow of control of the QOS program of FIG. 7 when maintaining the QOS on the network.

To maintain the proper QOS on the network 63, the nodes 64 of FIG. 6 may perform the procedure of the flowchart of FIG. 13. At step 250, the QOS program 85 of a node forms a message that includes a request for a network resource based on the QOS needs for the data traffic it is currently handling. The request identifies the nodes from whom the resource is being requested as well as the nature of the resource being requested. At step 252, the QOS program 85 broadcasts the request via the communication program 84 and the wireless medium 66 to the other nodes 64 using a QOS protocol. At Step 254, the QOS program 85 on each node receiving the request processes the request by referring to the routing database 70 and determining whether the resource is available. At step 256, each receiving node allocates the requested resource using a standard protocol, such as a two-phase commit protocol. The process then returns to step 250.

In view of the many possible embodiments to which the principals of this invention may be applied, it should be recognized that the embodiment described herein with respect to the drawing figures is meant to be illustrative only and should not be taken as limiting the scope of the invention. For example, a QOS resource request and new routing data as described above may be sent in a single message or as separate messages. Also, the invention may be used for other broadcasting or multicasting data other than the types of data described herein.

It should also be recognized that the ordering and the specific implementation of the program steps described above and depicted in the flowcharts of FIGS. 4, 10-13 is may be altered in obvious ways.

Those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

The invention claimed is:

1. A method of configuring a device comprising a node within a node set to exchange resources with other nodes of the node set, respective nodes of the node set sharing a network cache and having access to a land-based computer network accessible by the nodes via land-based links and a wireless computer network accessible by the nodes via a wireless channel, the method comprising:
   maintaining the network cache by exchanging messages representing updates of the network cache with other nodes of the node set only over the wireless computer network, wherein
      each node from the node set receives respective messages substantially in parallel; and
   exchanging respective resources among the nodes of the node set by:
      reserving land-based computer network resources for transmission of the resource only over the land-based computer network by exchanging quality of service messages only over the wireless computer network; and
      using reserved network resources, transmitting the resource only over the land-based computer network.

2. The method of claim 1, wherein the node set comprises a multicast group.

3. The method of claim 1, wherein the node set comprises a broadcast group.

4. The method of claim 1, maintaining the network cache further comprising:
   collecting local routing data; and
   including the local routing data in the messages exchanged only over the wireless computer network to update the network cache.

5. The method of claim 1, maintaining the network cache further comprising:
   updating a routing database with local routing data received from a node of the plurality of nodes; and
   including information on the updating to the messages exchanged only over the wireless computer network to update the network cache.

6. The method claim 1, maintaining the network cache further comprising:
   updating a routing database with new routing data derived from local routing data received from a node of the node set; and
   including the updated routing database in the messages exchanged over the wireless computer network to update the network cache.

7. The method of claim 1, wherein the wireless interface comprises a wireless interface card, and wherein the wireless interface card converts message to be sent over the wireless computer network into a physical transport format for transmission over the wireless channel.

8. The method of claim 1, wherein respective messages exchanged over the wireless computer network are transmitted to each node from the node set substantially in parallel using a single transmission.

9. The method of claim 1, exchanging the messages representing the updates of the network cache comprising:
upon updating the network cache, send a message representing the update to at least one other node of the node set over only the wireless computer network; and
upon receiving from at least one other node of the node set over only the wireless computer network a message representing an update of the network cache, update the network cache according to the message.

10. The method of claim 1:
the node set comprising at least one central server; and
exchanging the messages representing the updates of the network cache comprising:
if the device comprises a central server of the node set:
upon receiving over only the wireless computer network at least one message from another node representing an update of the network cache, send the message representing the update to other nodes of the node set; and
if the device does not comprise a central server of the node set:
upon updating the network cache, send a message representing the update to a central server over only the wireless computer network; and
upon receiving from a central server over only the wireless computer network a message representing an update of the network cache, update the network cache according to the message.

11. The method of claim 1, exchanging the quality of service messages for transmission of a resource comprising:
upon receiving a request to transmit a resource according to a quality of service, send a message over only the wireless computer network representing the request to at least one other node of the node set to allocate network resources according to the quality of service; and
upon receiving over only the wireless computer network from at least one other node of the node set a request to allocate network resources according to a request and a quality of service:
determining whether the network resource is available; and
upon determining that the network resource is available, allocating the network resource according to the request and the quality of service.

12. The method of claim 1:
the node set comprising at least one central server; and
exchanging the quality of service messages for transmission of a resource comprising:
upon receiving a request to transmit a resource according to a quality of service, send a message over only the wireless computer network representing the request to a central server; and
upon receiving over only the wireless computer network from a central server of the node set a request to allocate network resources according to a request and a quality of service:
determining whether the network resource is available; and
upon determining that the network resource is available, allocating the network resource according to the request and the quality of service.

13. A computer-readable storage device storing computer-executable instructions that, when executed by at least one processor of a device, cause the device to exchange resources with other nodes of the node set, respective nodes of the node set sharing a network cache and having access to land-based computer network accessible by the nodes via land-based links and a wireless computer network accessible by the nodes via a wireless channel by:
maintaining the network cache by exchanging messages representing updates of the network cache with other nodes of the node set only over the wireless computer network, wherein
each node from the node set receives respective messages substantially in parallel; and
exchanging respective resources among the nodes of the node set by:
reserving land-based computer network resources for transmission of the resource only over the land-based computer network by exchanging quality of service messages only over the wireless computer network; and
using reserved network resources, transmitting the resource only over the land-based computer network.

14. The computer-readable storage device of claim 13, maintaining the network cache further comprising:
collecting local routing data; and
including the local routing data in the messages exchanged only over the wireless computer network to update the network cache.

15. The computer-readable storage device of claim 13, maintaining the network cache further comprising:
forming a request for a network resource; and
including the request in the messages exchanged only over the wireless computer network to update the network cache.

16. The computer-readable nonvolatile storage device of claim 13, further comprising:
updating a routing database with local routing data received from a node of the plurality of nodes; and
including information on the updating to the messages exchanged only over the wireless computer network to update the network cache.

17. The computer-readable storage device of claim 13, exchanging the messages representing the updates of the network cache comprising:
upon updating the network cache, send a message representing the update to at least one other node of the node set over only the wireless computer network; and
upon receiving from at least one other node of the node set over only the wireless computer network a message representing an update of the network cache, update the network cache according to the message.

18. The computer-readable storage device of claim 13:
the node set comprising at least one central server; and
exchanging the messages representing the updates of the network cache comprising:
if the device comprises a central server of the node set:
upon receiving over only the wireless computer network at least one message from another node representing an update of the network cache, send the message representing the update to other nodes of the node set; and
if the device does not comprise a central server of the node set:
upon updating the network cache, send a message representing the update to a central server over only the wireless computer network; and
upon receiving from a central server over only the wireless computer network a message representing an update of the network cache, update the network cache according to the message.

19. The computer-readable storage device of claim 13, exchanging the quality of service messages for transmission of a resource comprising:
- upon receiving a request to transmit a resource according to a quality of service, send a message over only the wireless computer network representing the request to at least one other node of the node set to allocate network resources according to the quality of service; and
- upon receiving over only the wireless computer network from at least one other node of the node set a request to allocate network resources according to a request and a quality of service:
  - determining whether the network resource is available; and
  - upon determining that the network resource is available, allocating the network resource according to the request and the quality of service.

20. The computer-readable storage device of claim 13:
the node set comprising at least one central server; and
exchanging the quality of service messages for transmission of a resource comprising:
- upon receiving a request to transmit a resource according to a quality of service, send a message over only the wireless computer network representing the request to a central server; and
- upon receiving over only the wireless computer network from a central server of the node set a request to allocate network resources according to a request and a quality of service:
  - determining whether the network resource is available; and
  - upon determining that the network resource is available, allocating the network resource according to the request and the quality of service.

* * * * *